United States Patent [19]
Zick

[11] Patent Number: 5,837,879
[45] Date of Patent: Nov. 17, 1998

[54] METHODS AND APPARATUS FOR TESTING CENTRIFUGAL START MECHANISMS

[75] Inventor: Kenneth Edward Zick, Ft. Wayne, Ind.

[73] Assignee: General Electric Company, Fort Wayne, Ind.

[21] Appl. No.: 779,534

[22] Filed: Jan. 7, 1997

[51] Int. Cl.$^6$ ....................................................... G01L 5/00
[52] U.S. Cl. ................................................................. 73/1.37
[58] Field of Search ........................................ 73/1.41, 1.37, 73/865.3; 324/415

[56] References Cited

U.S. PATENT DOCUMENTS

| | | | |
|---|---|---|---|
| 1,805,192 | 5/1931 | Smith | 73/1.37 |
| 5,377,082 | 12/1994 | Fisher et al. | |
| 5,388,467 | 2/1995 | Jereb et al. | 324/415 |

*Primary Examiner*—Robert Raevis
*Attorney, Agent, or Firm*—Enrique J. Mora

[57] ABSTRACT

Methods and apparatus for automated testing of centrifugal start mechanisms for electric motors are described. In one embodiment, the system includes a stepper motor and an adapter secured to the stepper motor shaft. The adapter includes a shaft sized to have a diameter about equal to the diameter of a rotor shaft which carries the start mechanisms to be tested. The system also includes a fiber optic sensor having an optical signal transmitter and an optical signal receiver. The transmitter and receiver, in operation, are substantially aligned on opposing sides of a start mechanism secured to the adapter. When the push collar of a centrifugal start mechanism moves (e.g., at the cutout and cutback speeds), such movement is detected by the sensor. The system further includes a control computer coupled to a programmable motion controller. The motion controller is coupled to a stepper motor drive which is coupled to, and controls, the stepper motor so that the motor shaft accelerates and decelerates at a rapid but fixed rate.

34 Claims, 2 Drawing Sheets

METHODS AND APPARATUS FOR TESTING CENTRIFUGAL START MECHANISMS

FIELD OF THE INVENTION

This invention relates generally to electric motors and, more particularly, to automated testing of centrifugal start mechanisms for electric motors.

BACKGROUND OF THE INVENTION

Electric motors typically include a stator assembly having one or more windings and a rotor assembly rotatably mounted and extending through a bore in the stator assembly. In a typical configuration, the stator and rotor assemblies are located in a motor housing formed by a motor shell and motor endshields that close respective ends of the motor shell.

The stator assembly typically includes start and run windings. The start winding is utilized to initiate rotation of the motor rotor. Particularly, the magnetic field generated by the relatively high inductive reactance start winding in a resistance split phase motor may be about 30° out-of-phase (in both a physical sense and a time sense) with respect to the field generated by the relatively lower inductive reactance run winding. When the run and start windings are energized, the geometric and time phase relationship between magnetic fields generated by the run and start windings, and the magnetization of the rotor, cause the rotor to begin rotating from a standstill condition. Once the rotor has sufficient torque to attain its normal running speed, the start winding is "cutout" of the motor circuit so that the out-of-time phase geometrically spaced magnetic field generated by the start winding does not adversely impact motor operation.

In some electric motors, a centrifugal start mechanism and switch assembly are utilized to cutout the start winding. Particularly, the centrifugal start mechanism is carried on, and rotates with, the rotor shaft, and the switch assembly is secured to the motor housing. The centrifugal mechanism includes a push collar arranged to engage an actuator of the switch assembly. The switch assembly controls the energization of the stator windings based, in part, on the state of the actuator.

For example, as the centrifugal start mechanism rotates with the rotor shaft, and once centrifugal force is sufficient, the push collar springs forward into engagement with switch assembly actuator. The push collar moves the actuator from a first position to a second position. When the switch assembly actuator is in the second position, the switch assembly causes the motor start winding to be substantially disassociated from the motor run winding, i.e., cutout of the motor circuit.

The cutout speed is selected to be the speed at which the rotor has sufficient torque to attain its normal running speed. If the start winding is cutout prior to the rotor shaft attaining the cutout speed, then the motor may have difficulty in attaining the normal running speed. Such a condition, of course, is undesirable since the motor may operate very inefficiently under this condition.

When power is removed from the motor, and as the rotor shaft decelerates from its normal running speed, the centrifugal forces acting on the centrifugal start mechanism decrease. Once the centrifugal forces fall below a preselected magnitude, i.e., the rotor shaft speed falls below a preselected cutback speed, the push collar snaps out of engagement with the switch assembly actuator, and the actuator moves from the second position back to the first position.

In addition to deceleration caused by loss of power, the rotor shaft can decelerate due to an increased load on the shaft. For example, if the load exceeds the maximum rated load, the rotor shaft can begin to decelerate. If the load is sufficiently high, the rotor shaft speed can fall below the cutback speed. Under these conditions, the push collar snaps out of engagement with the switch assembly actuator, and the actuator moves from the second position back to the first position. As a result, the start winding is reenergized and the rotor shaft will begin to accelerate. Of course, if the rotor shaft accelerates to the cutout speed, the start winding will be cutout of the motor circuit as described above.

The cutback speed is selected to be a speed lower than the cutout speed to avoid unnecessarily reenergizing the start winding. If the start winding is energized during normal motor operation, the start winding could adversely affect motor efficiency. Also, if the cutout and cutback speeds are too close together, under the condition in which the rotor shaft decelerates to the cutback speed due to increased load, the motor can have very short cycles between energizing and deenergizing the start winding, which may lead to increased noise and other undesirable operating results.

In the past, centrifugal start mechanisms have been manually tested to ensure that such mechanisms properly operate to both cutout and cutback the motor windings at the desired rotor speed. Manually testing each centrifugal start mechanism is time consuming and subject to error.

In addition, such manual testing typically is performed after the entire motor has been assembled. If a faulty centrifugal start mechanism is identified in an assembled motor, the motor has to be partially disassembled in order to remove and replace the faulty start mechanism. Such late point testing which requires at least partial disassembly of a motor to repair or replace the start mechanism potentially increases the motor assembly costs.

Accordingly, it would be desirable and advantageous to provide an automated centrifugal start mechanism test system which is easy to use and is accurate. It would also be desirable and advantageous to provide such a test system which facilitates early identification of potentially unacceptable start mechanisms.

An object of the present invention is to provide an automated centrifugal start mechanism test system which is easy to use and is accurate.

Another object of the present invention is to provide such a system which quickly collects data related to the cutout and cutback speeds of a centrifugal start mechanism so as to avoid any significant delays in the motor assembly process.

Still another object of the invention is to provide such a system which facilitates early identification of potentially unacceptable start mechanisms.

Yet another object of the present invention is to provide such a system which is not expensive to implement and maintain.

SUMMARY OF THE INVENTION

These and other objects may be attained with methods and apparatus for automated testing of centrifugal start mechanisms for electric motors. In one embodiment, the system includes a stepper motor located within an enclosure. The stepper motor shaft is threaded at one end and an adapter is threadedly engaged to the one end of the shaft. The adapter includes a rear brace and a shaft which, when the adapter is engaged to the stepper motor, is concentric with the motor shaft. The adapter shaft is sized to have a diameter about equal to the diameter of a rotor shaft which carries the start mechanisms to be tested. The adapter also includes ball plungers secured to the adapter shaft which are adjustable so that a centrifugal start mechanism may be securely slide fit onto adapter.

The system also includes a fiber optic sensor for detecting motion of a start mechanism push collar. The sensor includes an optical signal transmitter and an optical signal receiver. The transmitter and receiver, in operation, are substantially aligned on opposing sides of a start mechanism secured to the adapter. When the push collar of a centrifugal start mechanism moves (e.g., at the cutout and cutback speeds), such movement is detected by the sensor. Particularly, and during start-up, the push collar substantially blocks the optical signal output by the transmitter from the receiver. When the push collar springs forward, the optical signal output by the transmitter is at least partially received by the optical signal receiver. By monitoring the output signal of the optical signal receiver, the position of the push collar can be determined.

The system further includes a control computer coupled to a programmable motion controller. The motion controller is coupled to a stepper motor drive which is coupled to, and controls, the stepper motor so that the motor shaft accelerates and decelerates at a rapid but fixed rate.

During the acceleration and deceleration of the stepper motor shaft, the computer controller monitors the logic state of the fiber optic sensor which is precisely aimed at the profile of the push collar of the start mechanism. During acceleration, when centrifugal forces cause the push collar to spring forward, as sensed by the state of the fiber optic sensor, as described above, the shaft speed at mechanism "cutout" is accurately recorded by the programmable motion controller and serially communicated to the control computer. The stepper motor is then decelerated as the system searches for the mechanism resetting or "cutback" speed. When the push collar snaps back, as sensed by the state of the fiber optic sensor, the shaft speed at mechanism "cutback" is accurately recorded by the programmable motion controller and serially communicated to the control computer.

The control computer maintains statistical records of cutout and cutback speeds for quantities of tested start mechanisms, and the control computer determines whether each sample is within specification limits. Various displays are generated by the control computer to indicate whether a particular start mechanism is acceptable.

The centrifugal start mechanism test system described above provides that advantage that start mechanism testing is substantially automated thereby reducing the time required to perform such testing and substantially reducing the possibility for human error as compared to known manual testing systems. In addition, the above described system enables testing the start mechanisms separately from an assembled motor. Therefore, faulty centrifugal start mechanism can be identified prior to being assembled into a motor. Avoiding the assembly of faulty start mechanisms into a complete motor is believed to facilitate reducing overall motor assembly cost and assembly time.

DETAILED DESCRIPTION

Figure 1:
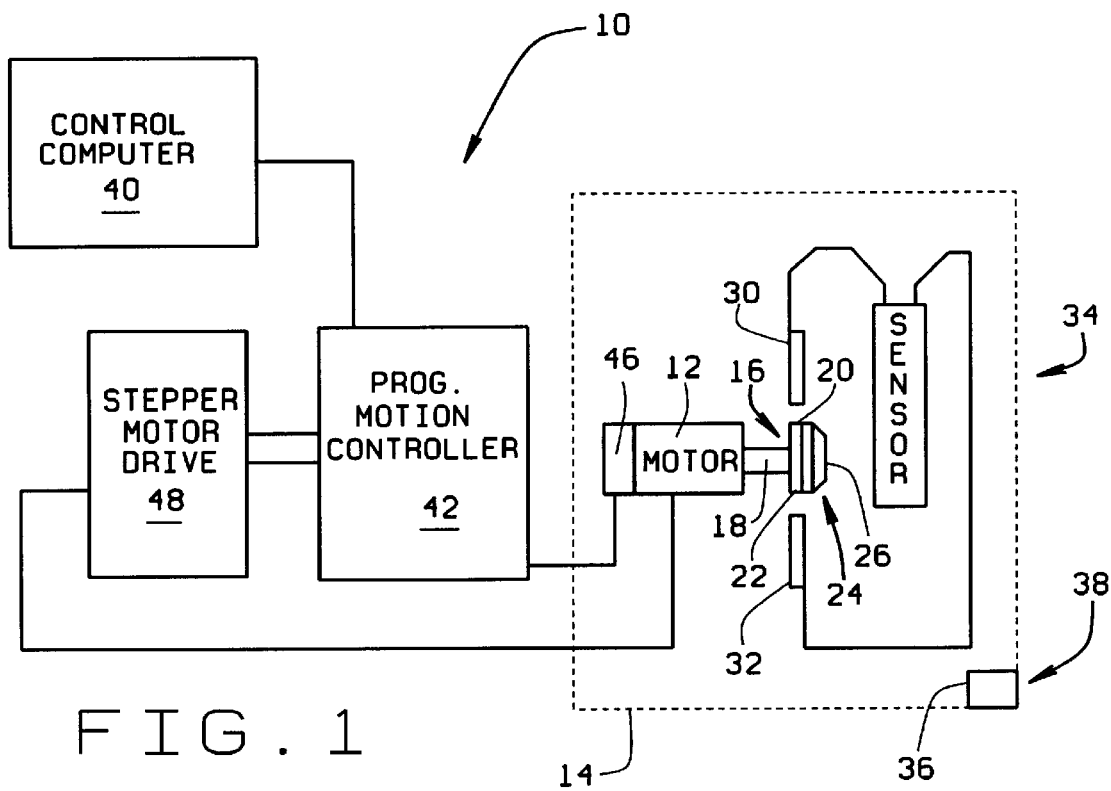
FIG. 1 is a block diagram illustrating a centrifugal start mechanism test system in accordance with one embodiment of the present invention.

FIG. 1 is a block diagram illustrating a centrifugal start mechanism test system 10 in accordance with one embodiment of the present invention. System 10 includes a stepper motor 12 located within an enclosure 14. One end 16 of shaft 18 of stepper motor 12 is threaded, and shaft 18 is threadedly engaged to an adapter 20. Adapter 20 includes a disk shaped rear brace 22, and a shaft (not shown in FIG. 1) extending from brace 22. When adapter 20 is secured to shaft 18, the adapter shaft is substantially concentric with motor shaft 18. The adapter shaft has a diameter approximately about equal to the diameter of the rotor shaft which will carry the start mechanisms to be tested. Adapter 20 also includes ball plungers (not shown in FIG. 1) which extend radially outward from the adapter shaft and are adjustable so that a centrifugal start mechanism may be securely fit to the adapter shaft. The specific configuration of adapter 20 may vary depending upon the centrifugal start mechanism to be tested. One embodiment of adapter 20 is described below in more detail. Preferably, a centrifugal start mechanism may be easily and quickly secured to adapter 20 using a slide fit to facilitate start mechanism testing. A start mechanism 24 including a push collar 26 is shown mounted to adapter 20.

A fiber optic sensor 28 to detect the motion of start mechanism push collar 26 also is located within enclosure 14. Sensor 28 includes an optical signal transmitter 30 and an optical signal receiver 32 substantially aligned with start mechanism 24. As described below in more detail, when push collar 26 moves (i.e., at cutout and cutback), such movement is detected by sensor 28.

Enclosure 14 also includes a slide-away door 34. An inductive sensor 36 is secured at one end 38 of slide-away door 34, and the signal output by sensor 36 may be used to verify that door 34 is closed as an operator safety measure.

System 10 also includes a control computer 40 coupled to a programmable motion controller 42. Programmable motion controller 42 contains a non-volatile numerical control program which is reloadable by computer 40. Under the direction of the control program, programmable motion controller 42 determines the status of enclosure door switch 36 and the fiber optic sensor output status. Particularly, controller 42 is coupled to receive inputs from sensors 28 and 36. In addition, controller 42 is connected to an encoder 46 secured to motor 12 for receiving data indicative of the motor speed.

Programmable motion controller 42 also is coupled to a stepper motor drive 48 for controlling the speed of motor 12. In general, and as described hereinafter in more detail, programmable motion controller 42, under the direction of control computer 40, controls the acceleration and deceleration of motor 12 through stepper motor drive 48.

In one specific embodiment, control computer 40 may be an IBM compatible personal computer, with a VGA display and keyboard. Particularly, computer 40 may be a HP Vectra 486 Computer System, commercially available from Computerland, 1625 Magnavox Way, Fort Wayne, Ind., which includes a Hewlett-Packard model 486/66XM or later equivalent model with 8M ram, 200MB hard drive, 3½ inch floppy drive, keyboard, mouse, and a Hewlett-Packard model D1196A color VGA monitor. A computer monitor support arm, such as a Media Mate 4 way bolt down arm, part number H299610, commercially available from Inmac, Inc., 55 United States Ave., Gibbsboro, N.J., may be used to support the computer display terminal and keyboard.

Control computer 40 is programmed in Microsoft Quick Basic 4.5 to perform supervisory control and operator interface tasks. Computer 40 is coupled to programmable motion controller 42 by a serial RS232 interface. The test results, as described below, are stored in summary form on the hard drive of computer 40 in the automatic test mode. Each type of start mechanism, uniquely identified by part number and group, has a separate test result file on the hard drive. Periodically, the hard disk test results can be transferred to a floppy disk and optionally erased from the hard drive.

Motor 12 may be a Slo-Syn model M062-FF-206C5 or M062-FF-206 stepper motor which includes a shaft encoder, drive 48 may be a model SS200D6 stepper motor drive unit, and controller 42 may be a model SS20001-V (revision B or higher software) programmable motion controller, all of which are commercially available from Superior Electric, Bristol, Conn. Optic sensor 28 may be an Idec Fiber Optic Amplifier and Sensor (sensor part number SA9F-TS and amplifier part number SA1C-FD3FC), commercially available from Ronald Ray Associates, Indianapolis, Ind. Inductive sensor 36 may be sensor part number BES-517-352-NO-L of Balluf, Inc., 8125 Holton Drive, Florence, Ky. Ball plungers for adapter 20 may be Vlier part number B50A, commercially available from Vlier Applied Power Corp., Burbank, Calif.

With respect to component switch settings for the specific commercially available components described above, the Idec fiber optic amplifier, for example, has three adjustment elements—the "SENS" potentiometer should be set to the MAX position, the "TIMER" potentiometer should be set to MIN, and the "MODE" switch should be set to L ON position. Further, a resolution of 2000 pulses per revolution should be selected for stepper motor drive model SS200D6. On stepper motor programmable motion controller model SS20001-V, the input/output switch should be set to "source" and 9600 baud should be selected for the communication rate.

Figure 2:
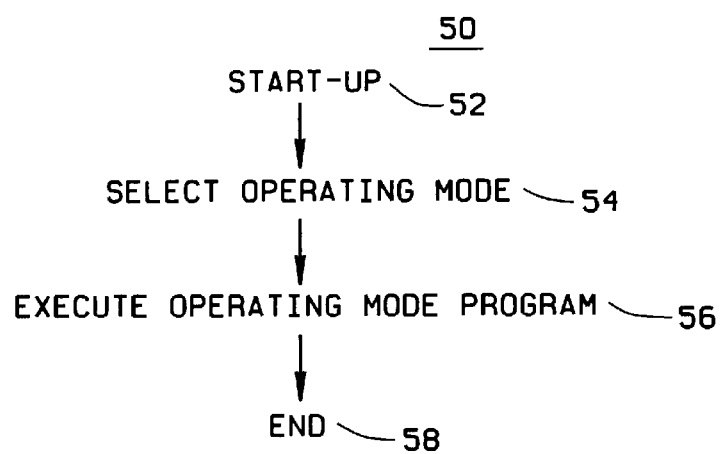
FIG. 2 is a flow chart illustrating a sequence of process steps executed in performing centrifugal start mechanisms tests using the system shown in FIG. 1.

FIG. 2 is a flow chart 50 illustrating a sequence of process steps executed in performing a centrifugal start mechanisms test using system 10. Particularly, for system start-up 52, power supply at 60 Hz, 115 volts is supplied to system 10. The power may be supplied through a surge suppressor power strip. As system 10 powers up, and with respect to the commercially available components identified above, red "power" lights on stepper motor drive 48 and on programmable motion controller 42 should be lit. Computer 40 should "boot" up automatically into the test program, as described below (MECHMGR), and display the following message.

CENTRIFUGAL MECHANISM TEST

If equipment power ready, enter 'A' to Advance, 'C' to download CNC program.

The operator then enters character "A" at the keyboard (or simply depresses the <Enter> key) to advance. It is only necessary to enter the C character if there is some possibility that the control program stored in controller 42 has been deleted. The following message is then displayed to the operator once A<Enter>, C<Enter,>, or the <Enter> key is depressed:

Checking communications with stepper motor controller.

If this message is not followed by additional lines on the display within a few seconds, it is possible that the RS232 communications between computer 40 and controller 42 have been corrupted during the power start-up. If so, then the operator should depress both the <Ctrl> key and depress the <Pause/Break> key at the upper right portion of the keyboard. The running MECHMGR program is halted and the DOS prompt, TEST>, should appear. The operator then enters the name of the program to restart it: MECHMGR<Enter>.

With proper communications between computer 40 and motion controller 42, the following three additional lines of information should be displayed after depressing the A (Advance) character. In addition, if the C character is entered, and after a series of messages which are the CNC program steps that the MECHMGR program is downloading to the motion controller from the data file have been displayed, the following three lines should be displayed.

| | |
|---|---|
| Door open | (or -> Door closed) |
| Mechanism sensed | (or -> Mechanism not sensed) |
| Equipment check complete. | |

The status of the door and mechanism sensing depends on whether door 34 is closed and whether a start mechanism has been placed on adapter 20 so that push collar 26 substantially blocks the optical signal output by transmitter 30.

Subsequent to start-up, an operating mode is selected and executed 56. In this regard, a new screen display should appear as follows.

| CENTRIFUGAL MECHANISM TEST | | |
|---|---|---|
| Number | Program | Function |
| 1 | MECHTEST | Begin automatic start mechanism testing |
| 2 | MECHZ | Simple start mechanism test |
| 3 | MECHSUM | Obtain summary statistics for start mech. tests |
| 4 | MECHCOPY | Copy summary files to floppy disk |
| 5 | MECHMGR | Repeat set-up of stepper motor controls |
| 6 | — | Energize step motor winding to change coupling |
| 7 | — | Exit to DOS |

Enter selection by number (1–7):?

The usual mode of operation is to begin testing in the automatic mode. This is selected by selecting option 1 which calls up program MECHTEST. The automatic test mode is described hereinafter in more detail. The other options are described below.

Option 2 calls up program MECHZ which is a basic testing routine that does not perform any checks against limits, statistical record keeping, or other details of the automatic test program MECHTEST. The program MECHZ allows the operator to more slowly approach the point of cutout. Particularly, upon entry, the operator is prompted for a minimum speed to which stepper motor 12 will ramp at a fairly fast rate before slowing its rate of ascent. This minimum speed should be about 100 or 200 rpm below the specified minimum free cutout rpm of the specific model and group of mechanisms being tested. When this speed is entered at the keyboard, system 10 waits for the mechanism to be positioned on adapter 20 and for door 34 to be closed. Controller 42 then ramps up motor 12 to the initial minimum speed while computer 40 displays speed readings. At the minimum speed, system 10 begins jogging up in small speed increments and checks for cutout. The operator may strike the S or F keys to jog up slower or faster. When cutout is detected by motion of push collar 26, stepper motor 12 begins jogging down in speed. Again, the deceleration rate can be slowed or made faster by depressing the S or F keys. When cutback is detected by motion of push collar 26, and if no more testing is needed, the MECHZ program is exited and the MECHMGR program is re-entered. The screen display showing the various options is then displayed by computer 40.

Main menu option 3 of the MECHMGR program calls up program MECHSUM which is a routine for generating a screen display of the summary statistics for a specific start mechanism model/group that has been tested in the automatic mode (MECHTEST). Particularly, upon entry, the operator is prompted for a summary data file name, SM1.DAT, SM2.DAT, . . . SM21 after displaying a list of the accumulated file names. For example, SM10.DAT correlates with Group 1 of model 52B206576, and SM11.DAT contains summary data for group 2. In one particular embodiment, there are twenty one mechanism model/groups recognized for which a separate, appendable summary data file can be created if that type of mechanism has been tested. Computer 40 displays summary statistics in the following format based on the contents of the start mechanism summary data file.

Ordinarily motor 12 is de-energized when not in motion and shaft 18 turns by hand. With the locking torque, however, shaft adapter 20 can be easily disengaged, i.e., unscrewed from shaft 18 while shaft 18 is locked. When any keyboard key is depressed, the windings de-energize again and the option 6 activity is complete. The windings should not be left in the energized state for more than a few minutes or motor 12 may get hot.

Option 7 of the main menu causes the MECHMGR program to terminate and return to the Microsoft DOS prompt in directory TEST. This directory contains all the run programs, MECHTEST, MECHSUM, etc., along with the test data files. To return to the test routines, the operator enters either the name of the program MECHMGR or the automatic test program, MECHTEST.

Upon selection and execution of the operating mode program, operations end 58. The operations performed at the end of program execution are described below in more detail with respect to the automatic test.

Figure 3:
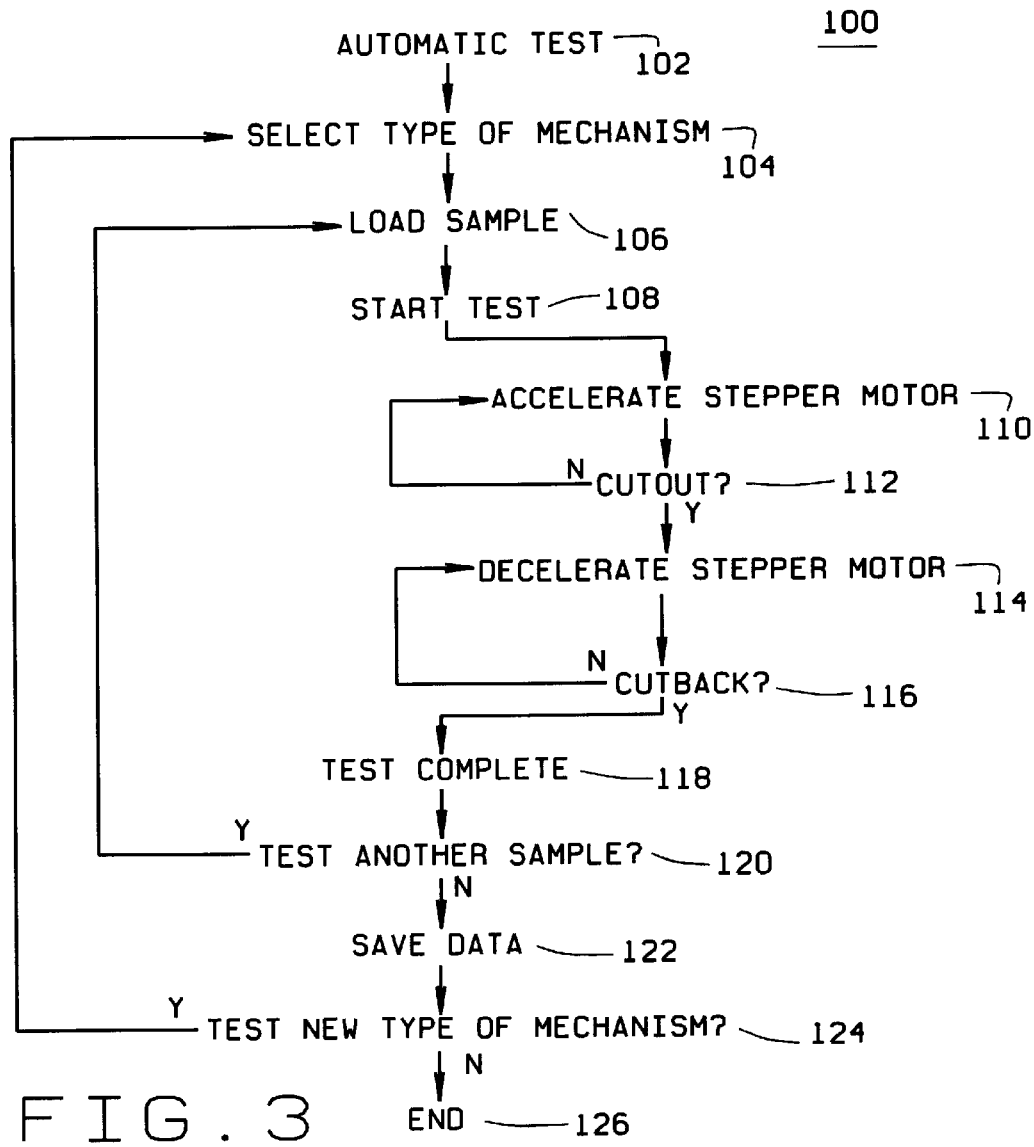
FIG. 3 is a flow chart illustrating the process steps executed in performing an automated test on a centrifugal start mechanism using the system shown in FIG. 1.

More specifically, FIG. 3 is a flow chart 100 illustrating the process steps executed in performing an automatic test 102 on a centrifugal start mechanism using system 10. As explained above, for automatic test, MECHTEST is selected with option 1 from the MECHMGR main menu. Before selecting the automatic test, it may be advantageous to verify that a start mechanism sample slips easily onto stepper motor shaft adapter 20 with push collar 26 against adapter rear brace 22. This condition may be verified if a green LED of fiber optic sensor 28 is lit, which means that the optical

START MECH TEST SUMMARY FOR MODEL _____
GROUP 3 CO = 1005/630 CB = 600

| | CUTOUT | | | | CUTBACK | | | |
|---|---|---|---|---|---|---|---|---|
| SAMPLE | AVGVAL | 3SIGMA | MINOBS | MAXOBS | AVGVAL | 3SIGMA | MINOBS | MAXOBS |
| ->11-11-1996 | 14:06 | Tested: | 15 | Failed: | 9 Pct. Failed: | | 60.00000 | |
| 15 | 829.2 | 21.74 | 817.1 | 840.4 | 383.3 | 29.64 | 366.7 | 399.1 |
| ->11-11-1996 | 14:29 | Tested: | 16 | Failed: | 11 Pct. Failed: | | 68.75000 | |
| 16 | 828.7 | 17.77 | 817.1 | 820.2 | 383.1 | 31.79 | 366.0 | 405.2 |

This summary normally is generated using a large data batch for each run of the automatic test. The date and time shown is the date and time of run completion. The actual data file, SM10.DAT, etc., from which this summary is derived preserves only the summary data—sums and sums of squares of cutout and cutback readings along with accumulated sample counts—rather than individual readings for each sample.

Option 4 of the main MECHMGR menu selects program MECHCOPY. Program MECHCOPY is a routine for copying test summary files, SM1.DAT, SM2.DAT, etc., from the hard disk of computer 40 to one or more floppy disks in order to transfer the results to another computer for review or hard copy. Such copying typically would be done in conjunction with the shipment of start mechanisms from the start mechanism supplier to the motor assembly site. At the completion of the data file transfer to the floppy, the operator has an option to delete all data files from the hard disk.

Option 5 of the main menu causes the MECHMGR program to revert to the beginning of the sequence and request entry of A or C to check the communications and input sensors, as described above. The complete termination of all other programs also causes program MECHMGR to be re-entered.

When option 6 of the MECHMGR menu is selected, the windings of stepper motor 12 are energized at zero speed so that motor shaft 18 cannot be turned due to locking torque.

signal output by transmitter 30 is substantially blocked from receiver 32. If a red LED is lit, push collar 26 may not be fully secured and therefore, collar 26 may not break the light path. If it is evident the fit is too tight or loose, or if a wrong adapter 20 is mounted on stepper motor shaft 18, option 6 from the MECHMGR main menu may be selected to briefly energize the stepper motor windings so that adapter 20 can be disengaged from shaft 18. If necessary, the individual ball plungers may be adjusted so the start mechanism sample can fully slip on shaft adapter 20 with an easy slide fit.

Once option 1 (MECHTEST) has been selected from the MECHMGR menu (or from the DOS level when in the TEST directory), a list of centrifugal mechanism models and groups are displayed. An exemplary display is shown in Table 1 below. The table shows the free cutout upper and lower limits, the cutback upper limit, and a number of physical characteristics of each recognized type of start mechanism. The limits for cutout shown in the table are subject to change since they are based on test data derived from tests performed on manual equipment. This screen is derived from data file MECHSPEC.LST which must be edited if any of the cutout and cutback limits are modified due to new specifications for the faster, automatic test.

The <space> key is used to move the highlighted model/group to the line which identifies the type of mechanism to be tested. The highlighting begins at the top of the list so, for example, if group 2 of a model 52B206576 design is to be tested, the <space> key would be struck 10 times to reach the correct identification. The operator confirms that the mechanical characteristics of the mechanism batch to be tested agree with the display on the screen, including that the spring and body colors shown are in agreement as well as the bore size. When the operator confirms that the correct model/group is highlighted, the operator depresses the <Enter> key to select the type of mechanism to be tested 104.

MOUNT MECHANISM AND CLOSE DOOR

Enclosure door 34 should be closed to begin the test. If the mechanism is not properly located as determined by sensor 28, the display changes to:

MECHANISM NOT SENSED

Sliding door 34 may then be opened, the sample relocated on adapter 20, and door 34 is re-closed to resume the test.

Control computer 40, through programmable motion controller 42 and stepper motor drive 48, then starts the test 108

TABLE 1

Initial display screen in program MECHTEST

| MODEL | GROUP | CUTOUT | CUT-BACK | BORE | C-CODE | B-MAX | SPR. COLOR |
|---|---|---|---|---|---|---|---|
| 52B206575 | 1 | 2975/2800 | 2000 | .500 | None | 0.90 | Brown |
| 52B206575 | 2 | 1500/1390 | 1000 | .500 | None | 0.99 | Yellow |
| 52B206575 | 3 | 1005/830 | 600 | .500 | None | 1.12 | Yellow |
| 52B206575 | 4 | 760/650 | 450 | .500 | Brown | 1.12 | Green |
| 52B206575 | 5 | 2430/2290 | 1650 | .500 | Yellow | 0.90 | Yellow |
| 52B206575 | 6 | 1250/1150 | 825 | .500 | Green | 0.99 | Green |
| 52B206575 | 7 | 835/650 | 500 | .500 | Red | 1.12 | Green |
| 52B206575 | 9 | 1300/1200 | 875 | .500 | Blue | 0.99 | Blue |
| 52B206575 | 11 | 2130/1870 | 1320 | .500 | Black | 0.90 | Yellow |
| 52B206576 | 1 | 2975/2800 | 2000 | .669 | None | 0.90 | Brown |
| 52B206576 | 2 | 1500/1390 | 1000 | .669 | None | 0.99 | Yellow |
| 52B206576 | 3 | 1005/830 | 600 | .669 | None | 1.12 | Yellow |
| 52B206576 | 4 | 760/650 | 450 | .669 | Brown | 1.12 | Green |
| 52B206576 | 5 | 2430/2290 | 1650 | .669 | Yellow | 0.90 | Yellow |
| 52B206576 | 6 | 1250/1150 | 825 | .669 | Green | 0.99 | Green |
| 52B206576 | 7 | 835/650 | 500 | .669 | Red | 1.12 | Green |
| 52B206576 | 9 | 1300/1200 | 875 | .669 | Blue | 0.99 | Blue |
| 52B206576 | 11 | 2130/1870 | 1320 | .669 | Black | 0.90 | Yellow |
| 52B206576AA | 1 | 2975/2800 | 2000 | .669 | None | 0.90 | Brown |
| 52B206576AA | 11 | 2130/1870 | 1320 | .669 | Blue | 0.90 | Yellow |
| 52B206576AA | 22 | 1740/1600 | 1160 | .669 | None | 0.90 | Red |

If a group 6 –576 mechanism is chosen, the program generates the following screen display:

CENTRIFUGAL MECHANISM TEST with a line at the bottom of the screen:

Depress 'Enter' to start test

When the operator depresses the <Enter> key, a line is added near the top of the screen as:

Centrifugal Mechanism Test—Sample #1

This line gets updated with a new number as each new sample is ready to test. A line also appears at the bottom of the screen as:

Depress 'space' key when ready and close door:

The operator depresses the space key after the sample to be tested is loaded 106 with push collar 26 completely against rear brace 22. Sensor 28 may be used to verify that the beam is interrupted as evidenced by only the green LED of sensor 20 being lit as described above.

After the <space> key is depressed, a prompt is displayed at the bottom of the screen to remind the operator to mount the sample and close enclosure door 34 to begin the test:

by accelerating stepper motor 12 from zero speed at a rate of 300 RPM per second while to continuing to examine the state of both sensor 28 and sliding door 34. If door 34 is opened while shaft 18 is in motion, motor 12 is immediately de-energized and the test is aborted. The sample will be counted as a failure but no statistics will be noted.

In normal operation, motor 12 continues to accelerate 110 until cutout occurs 112. Cutout is sensed by motion of push collar 26, and stepper motor 12 begins to decelerate 114 at the rate of 300 RPM per second until cutback is detected when push collar 26 returns to its home position 116.

The test is then complete 118 and control computer 40 determines updated statistics based on the readings from encoder 46 at the sensed cutout and cutback speeds. If door 34 has been opened at any time before stepper motor 12 comes to a halt, one or both speed readings will be given as 9999.9 RPM, which indicates a test failure.

At completion of the test, the display of computer 40 has the following format.

CENTRIFUGAL MECHANISM TEST

| MODEL | GROUP | CUTOUT | CUTBACK | BORE | C-CODE | B-MAX | SPR. COLOR |
|---|---|---|---|---|---|---|---|
| 52B206576 | 3 | 1005/830 | 600 | .669 | None | 0.99 | Yellow |

Centrifugal Mechanism Test - Sample # 16

Cut-Out Speed, RPM: 828.3
Cut-Back Speed, RPM: 367.1

FAIL

Units Tested: 16   Units Failed: 11
      Percent Failed: 68.75000

| ⟵ CUTOUT ⟶ | | | | | ⟵ CUTBACK ⟶ | | | | |
|---|---|---|---|---|---|---|---|---|---|
| LASTRD | AVGVAL | 3SIGMA | MINOBS | MAXOBS | LASTRD | AVGVAL | 3SIGMA | MINOBS | MAXOBS |
| 823.3 | 828.7 | 17.77 | 820.2 | 839.8 | 367.1 | 383.1 | 31.79 | 366.0 | 405.2 |

The operator then opens sliding door 34 and removes the sample just tested. The box in the middle right side of the screen may be green colored with the message PASS inside if the sample has a cutout reading within limits and a cutback speed below the minimum. If the readings fall outside of specified limits, the box may be red colored with the word FAIL inside. Passed and failed samples should be placed in separate containers. Where possible, failed units may be repaired and retested.

At the bottom of the screen, the following prompt is displayed:

More? (Y/N)

If an additional sample of the current batch of a specific model/group is to be tested 120, the operator depresses the Y key or any key other than the key N. The display then updates the sample number and processing returns to step 106. Note that if a <space> key is used to call for another sample run rather than depressing a Y key, an extra keystroke can be avoided since a <space> key is expected in step 106 when the next sample has been mounted.

If no more samples of a specific model and group are to be tested, the operator enters character N. The statistical data is then saved 122 to a disk file. The following message is then displayed at the bottom of the screen:

Test new model or group? (Y/N)

If the operator wants to continue testing a new batch of start mechanisms 124 without any other intervening activity, a Y character should be depressed on the keyboard. Processing then returns to step 104 where a list of models is presented as in Table 1. If any character other than Y is depressed, computer 40 exits the MECHTEST program and moves into the MECHMGR program where the main menu is again displayed. Operations then end 126 for the automatic test.

To shut down at the end of a shift, for example, it is not necessary to power down system 10. It is advisable to turn off the display of computer 40 to avoid extended time with the same pattern on the screen. Stepper motor 12 should not be energized. This is avoided by stopping the automatic testing sequence at a normal stopping point such as a user prompt. The keyboard should be covered.

If system 10 is not to be used for a long weekend or extended period of a day or more while not in use, a complete power down is suggested. Power should be removed from system 10 and the keyboard and display covered with a plastic sheet to minimize affects of factory dirt.

The screen displays described above can be in English or any other language. Although all the screen displays set forth above are in the English language, it is contemplated, of course, that other languages can be used.

In the event that a routine is entered incorrectly, there is some apparent disruption of the communication interface between computer 40 and motion controller 42 within a running program, or the operator has entered a wrong response, a running program can be interrupted by depressing the <Ctrl> key and depressing the <Pause/Break> key at the upper right of the keyboard. The operator then enters MECHMGR or the name of the program that was to have been entered to resume or restart activities. Summary statistics data may be lost if the MECHTEST is interrupted.

Stepper motor 12 is intended for continuous use and is an important component of test system 10. Stepper motor 12 can be damaged, for example, from excessive thrust force. Twenty five pounds, for example, is the specified maximum force for the Slo-Syn model M062-FF-206 identified above. If any extra force is needed to fully engage the sample on adapter 20, it is preferred to select option 6 from the MECHMGR menu to assist in removing shaft adapter 20 and then make any necessary adjustments of the ball plungers on adapter 20 so an easy sliding motion is all that is needed to slip the sample on adapter 20. A soft cloth or a toothpick can be used to clean the ball plungers if white plastic residue from mechanisms clings to ball plunger exposed surfaces. This allows the ball plungers to operate more freely.

In addition to mechanical considerations of stepper motor 12, it is important to check the surface temperature of the stepper motor frame occasionally after a long series of repeated automatic testing. This is particularly true for group 1 mechanism testing where it may take 10 seconds to reach cutout speed each time. If the motor frame is too hot to touch, testing should be stopped for several minutes to allow motor 12 to cool down. The motor frame temperature should not exceed 100C. If deemed appropriate, a small cooling fan may be used to keep motor 12 cooler.

Computer 40, stepper motor drive 48, and motion controller 42 should be kept reasonably clean and cool. If the ambient temperature exceeds 35C., it may be advisable to increase the size of the cooling fan.

In one specific implementation, computer 40, controller 42 and drive 48 may be mounted in an equipment cabinet. Enclosure 14 may be constructed using, for example, clear Lexan material. A clear, hinged Lexan cover over the front of the computer chassis can be provided and kept closed to assist in keeping the floppy disk drive slot clean. The continuing operability of the floppy drive is important for maintaining archived records of test results.

The centrifugal start mechanism test system described above provides that advantage that start mechanism testing is substantially automated thereby reducing the time required to perform such testing and substantially reducing the possibility for human error as compared to known manual testing systems. In addition, the above described system enables testing the start mechanisms separately from an assembled motor. Therefore, faulty centrifugal start mechanisms can be identified prior to being assembled into motors. Avoiding the assembly of faulty start mechanisms into a complete motor is believed to facilitate reducing overall motor assembly cost and assembly time.

Figure 4A:
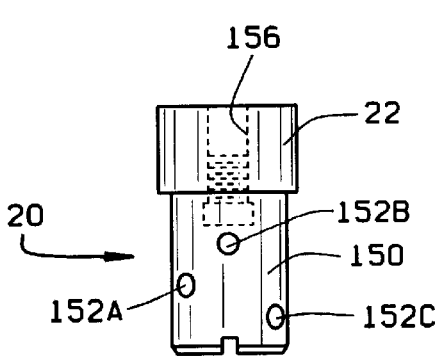
FIG. 4A is a top view of an adapter of the test system shown in FIG. 1.
Figure 4B:
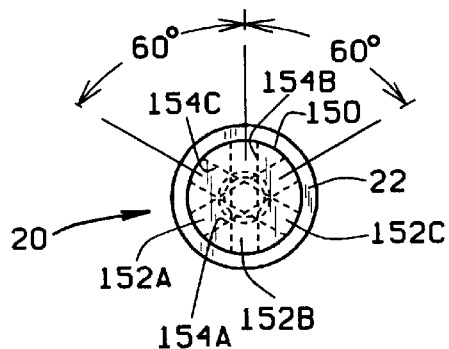
FIG. 4B is an end view of the adapter.

FIG. 4A is a top view of adapter 20 and FIG. 4B is an end view of adapter 20. As described above, adapter 20 includes disk shaped rear brace 22, and a shaft 150 extending from brace 22. Adapter shaft 150 has a diameter approximately about equal to the diameter of the rotor shaft which will carry the start mechanisms to be tested. Ball plungers 152A, 152B, and 152C are secured within respective bores 154A, 154B, and 154C in shaft 150, and plungers 152A, 152B, and 152C extend radially outward from adapter shaft 150. Plungers 152A, 152B, and 152C are adjustable so that a centrifugal start mechanism may be securely fit to adapter shaft 150. The center axis of bore 154A is radially spaced approximately about sixty degrees from the center axis of bore 154B, and the center axis of bore 154C is radially spaced approximately about sixty degrees from the center axis of bore 154B. Preferably, plungers 152A, 152B, and 152C are adjusted so that a centrifugal start mechanism may be easily and quickly "slide" fit on shaft 150 against rear brace 22.

Adapter 20 further includes a threaded shaft bore 156 for being threadedly secured to motor shaft 18 (FIG. 1). The center axis of bore 156 is coaxial with the center axis of shaft 150 so that when adapter 20 is threadedly engaged to motor shaft 18, adapter shaft 150 is substantially concentric with motor shaft 18.

From the preceding description of several embodiments of the present invention, it is evident that the objects of the invention are attained. Although the invention has been described and illustrated in detail, it is to be clearly understood that the same is intended by way of illustration and example only and is not to be taken by way of limitation. Accordingly, the spirit and scope of the inventions are to be limited only by the terms of the appended claims.

What is claimed is:

1. Apparatus for testing a centrifugal start mechanism including a movable push collar, said apparatus comprising:
   a motor including a rotatable shaft for carrying the start mechanism;
   an optical sensor for detecting movement of the push collar as the motor shaft rotates; and
   a controller coupled to said motor and to said sensor for obtaining data indicative of the motor shaft speed when movement of the push collar is detected.

2. Apparatus in accordance with claim 1 wherein said motor comprises an encoder for generating signals representative of the speed of said motor shaft.

3. Apparatus in accordance with claim 2 wherein said encoder is electrically connected to said controller and output signals from said encoder are provided to said controller.

4. Apparatus in accordance with claim 1 wherein said optical sensor comprises an optical signal transmitter, and an optical signal receiver, said transmitter and receiver positionable on opposing sides of said motor shaft so that when in a first position, the push collar substantially blocks optical signals output by said transmitter from being received by said receiver.

5. Apparatus in accordance with claim 1 wherein said controller comprises a programmable motion controller.

6. Apparatus in accordance with claim 1 further comprising a stepper motor drive coupled to received control signals from said controller, said drive coupled to said motor to control acceleration and deceleration of said motor shaft based on control signals received from said controller.

7. Apparatus in accordance with claim 1 further comprising a control computer coupled to said controller.

8. Apparatus in accordance with claim 7 wherein said control computer comprises a display and said computer is programmed to generate display screens for communicating data to an operator.

9. Apparatus in accordance with claim 7 wherein said computer comprises an operator interface so that an operator can initiate testing.

10. Apparatus in accordance with claim 1 further comprising an enclosure, said motor and said sensor positioned substantially within said enclosure.

11. Apparatus in accordance with claim 10 wherein said enclosure comprises a door and a door sensor, said door sensor operable to generate a signal indicative as to whether said door is fully closed.

12. Apparatus in accordance with claim 11 wherein said door sensor is coupled to said controller, and said controller substantially prevents operation of said motor if said door sensor indicates that said door is not fully closed.

13. Apparatus in accordance with claim 1 further comprising an adapter for being secured to said motor shaft, said adapter comprising a shaft for carrying the start mechanism during a test.

14. Apparatus in accordance with claim 13 wherein said adapter shaft is sized so that the start mechanism is retained thereon by friction fit.

15. Apparatus in accordance with claim 13 wherein said controller substantially prevents operation of said motor if the start mechanism is not fully secured to said adapter shaft.

16. A system for determining whether a centrifugal start mechanism including a movable push collar properly operates at a selected cutout speed and a selected cutback speed, said system comprising:
   a motor including a rotatable shaft for carrying the start mechanism;
   a sensor for detecting movement of the push collar as the motor shaft rotates;
   a controller coupled to said motor and to said sensor for obtaining data indicative of the motor shaft speed when movement of the push collar is detected, said controller configured to control acceleration of said motor shaft to a speed higher than the selected cutout speed and configured to control deceleration of said motor shaft to a speed lower than the selected cutback speed, and
   memory storage coupled to said controller for storing data indicative of the motor shaft speed when said sensor detects movement of said push collar during acceleration and deceleration of said motor shaft; and
   an adapter for being secured to said motor shaft, said adapter comprising a shaft for carrying the start mechanism during a test, and said controller substantially preventing operation of said motor if the start mechanism is not fully secured to said adapter shaft.

17. A system in accordance with claim 16 wherein said motor comprises an encoder for generating signals representative of the speed of said motor shaft, said controller and output signals from said encoder are provided to said controller.

18. A system in accordance with claim 16 wherein said sensor comprises an optical sensor, said optical sensor comprising an optical signal transmitter and an optical signal receiver, said transmitter and receiver positionable on opposing sides of said motor shaft so that when in a first position, the push collar substantially blocks optical signals output by said transmitter from being received by said receiver.

19. A system for determining whether a centrifugal start mechanism including a movable push collar properly operates at a selected cutout speed and a selected cutback speed, said system comprising:

a motor including a rotatable shaft for carrying the start mechanism;

a sensor for detecting movement of the push collar as the motor shaft rotates;

a controller comprising a programmable motion controller, said controller coupled to said motor and to said sensor for obtaining data indicative of the motor shaft speed when movement of the push collar is detected, said controller configured to control acceleration of said motor shaft to a speed higher than the selected cutout speed and configured to control deceleration of said motor shaft to a speed lower than the selected cutback speed, and memory storage coupled to said controller for storing data indicative of the motor shaft speed when said sensor detects movement of said push collar during acceleration and deceleration of said motor shaft; and a stepper motor drive coupled to receive control signals from said controller, said drive coupled to said motor to control acceleration and deceleration of said motor shaft based on control signals received from said controller.

20. A system in accordance with claim 19 wherein said motor comprises an encoder for generating signals representative of the speed of said motor shaft, said controller and output signals from said encoder are provided to said controller.

21. A system in accordance with claim 19 wherein said sensor comprises an optical sensor, said optical sensor comprising an optical signal transmitter and an optical signal receiver, said transmitter and receiver positionable on opposing sides of said motor shaft so that when in a first position, the push collar substantially blocks optical signals output by said transmitter from being received by said receiver.

22. A system in accordance with claim 19 further comprising a control computer coupled to said controller, said computer comprising said memory storage and a display, said computer programmed to generate display screens for communicating data to an operator.

23. A system in accordance with claim 16 further comprising a control computer coupled to said controller, said computer comprising said memory storage and a display, said computer programmed to generate display screens for communicating data to an operator.

24. A system for determining whether a centrifugal start mechanism including a movable push collar properly operates at a selected cutout speed and a selected cutback speed, said system comprising:

a motor including a rotatable shaft for carrying the start mechanism;

a sensor for detecting movement of the push collar as the motor shaft rotates;

a controller coupled to said motor and to said sensor for obtaining data indicative of the motor shaft speed when movement of the push collar is detected, said controller configured to control acceleration of said motor shaft to a speed higher than the selected cutout speed and configured to control deceleration of said motor shaft to a speed lower than the selected cutback speed, and memory storage coupled to said controller for storing data indicative of the motor shaft speed when said sensor detects movement of said push collar during acceleration and deceleration of said motor shaft; and an enclosure, said motor and said sensor positioned substantially within said enclosure, said enclosure comprising a door and a door sensor, said door sensor operable to generate a signal indicative as to whether said door is fully closed, said door sensor coupled to said controller, said controller substantially prevents operation of said motor if said door sensor indicates that said door is not fully closed.

25. A system in accordance with claim 21 wherein said motor comprises an encoder for generating signals representative of the speed of said motor shaft, said controller and output signals from said encoder are provided to said controller.

26. A system in accordance with claim 24 wherein said sensor comprises an optical sensor, said optical sensor comprising an optical signal transmitter and an optical signal receiver, said transmitter and receiver positionable on opposing sides of said motor shaft so that when in a first position, the push collar substantially blocks optical signals output by said transmitter from being received by said receiver.

27. A system in accordance with claim 24 further comprising a control computer coupled to said controller, said computer comprising said memory storage and a display, said computer programmed to generate display screens for communicating data to an operator.

28. A method for operating a test system for determining whether a centrifugal start mechanism including a movable push collar properly operates at a selected cutout speed and a selected cutback speed, the system including a motor including a rotatable shaft for carrying the start mechanism, an optical sensor for detecting movement of the push collar as the motor shaft rotates, and a controller coupled to the motor and to the sensor, said method comprising the steps of:

accelerating the motor shaft to a speed at which movement of the push collar is detected; and recording a first motor shaft speed when the push collar moves in a first direction.

29. A method in accordance with claim 28 further comprising the step of comparing the first recorded motor shaft speed to the selected shaft cutout speed.

30. A method in accordance with claim 29 further comprising the step of indicating a test failure if a difference between the first recorded motor shaft speed and the selected shaft cutout speed is greater than a predetermined threshold.

31. A method in accordance with claim 28 further comprising the steps of:

decelerating the motor shaft to a speed at which movement of the push collar is detected; and recording a second motor shaft speed when the push collar moves in a second direction.

32. A method in accordance with claim 31 further comprising the step of comparing the second recorded motor shaft speed to the selected shaft cutback speed.

33. A method in accordance with claim 32 further comprising the step of indicating a test failure if the second recorded motor shaft speed is greater than the selected shaft cutback speed.

34. A method in accordance with claim 32 further comprising the step of indicating a test failure if the second recorded motor shaft speed is greater than the selected shaft cutback speed plus an acceptable tolerance value.

* * * * *